United States Patent [19]
Foladare et al.

[11] Patent Number: 5,805,991
[45] Date of Patent: Sep. 8, 1998

[54] TECHNIQUE FOR ELIMINATING FREE PAGING IN A PERSONAL MOBILE COMMUNICATION SYSTEM

[75] Inventors: Mark Jeffrey Foladare, Kendall Park; Shelley B. Goldman, East Brunswick; David Phillip Silverman, Somerville, all of N.J.

[73] Assignee: AT&T Corp., Middletown, N.J.

[21] Appl. No.: 497,060

[22] Filed: Jun. 30, 1995

[51] Int. Cl.$^6$ ................................ H04Q 7/00; H04Q 7/38
[52] U.S. Cl. ................ 455/406; 455/81.2; 455/313; 455/458; 455/459; 455/408
[58] Field of Search .................... 379/57, 58, 59; 455/31.2, 31.3, 458, 459, 460, 31.1, 406, 408, 407, 403, 414; 348/825.44

[56] References Cited

U.S. PATENT DOCUMENTS

| | | | |
|---|---|---|---|
| 4,885,577 | 12/1989 | Nelson | 340/825.44 |
| 5,140,626 | 8/1992 | Ory et al. | 455/459 |
| 5,224,150 | 6/1993 | Neustein | 455/31.2 |
| 5,307,399 | 4/1994 | Dai et al. | 455/31.2 |
| 5,329,578 | 7/1994 | Brennan et al. | 379/67 |
| 5,414,750 | 5/1995 | Bhagat et al. | 455/459 |
| 5,473,667 | 12/1995 | Neustein | 455/31.2 |
| 5,559,859 | 9/1996 | Dai et al. | 455/462 |
| 5,561,703 | 10/1996 | Arledge et al. | 455/31.2 |
| 5,598,457 | 1/1997 | Foladare et al. | 455/459 |
| 5,608,782 | 3/1997 | Carlsen et al. | 455/460 |
| 5,644,626 | 1/1997 | Carlsen | 455/459 |

Primary Examiner—Dwayne D. Best
Assistant Examiner—Tracy M. Legree
Attorney, Agent, or Firm—Stephen M. Gurey

[57] ABSTRACT

A system and method for processing telephone calls to a personal telephone number, such calls being of the type in which a call to a called party's personal telephone number results in a page to a pager of a called party and the caller's call is held in the network to be bridged to a return telephone call of the called party, employs type-ahead for faster perceived system response while not permitting free paging. In particular, although type-ahead is permitted, the page is not immediately initiated upon receipt of the last character of a valid command string prior to the end of the announcement that is played to the caller upon his call reaching a bridging and signaling unit. Instead, the bridging and signaling unit is arranged to respond so that it appears to have accepted and executed the command, and moves into the next phase of operation, e.g., music on hold. However, the page is not initiated until it is determined that both 1) the entire time for the announcement has elapsed from the receipt of the caller's call, i.e., the time of commencement of billing has arrived, and 2) the caller remains on the call at that time.

16 Claims, 5 Drawing Sheets

5,805,991

TECHNIQUE FOR ELIMINATING FREE PAGING IN A PERSONAL MOBILE COMMUNICATION SYSTEM

TECHNICAL FIELD

This invention relates to personal communications and, more particularly, to systems for setting up communications between a caller and a called individual using a combination of paging and telephone call bridging.

BACKGROUND OF THE INVENTION

A problem with setting up telecommunications connections today is the difficulty of locating called individuals who are highly mobile. This problem is partially alleviated by mobile telephone technology and radio paging systems. In one prior art system, described in copending application Ser. No. 08/138,887 assigned to the same assignee as the present application, in response to a telephone call from a caller, a telephone call, namely, the so-called "return telephone call", is placed by a called individual to a meet-me bridge of a bridging and signaling unit at which the caller's telephone call is held for connection to the return telephone call. Upon receipt of the return telephone call at the bridging and signaling unit, the caller's telephone call and the return telephone call are bridged, i.e., connected, together at the meet-me bridge holding the caller's call, so that the caller and the called party may communicate.

SUMMARY OF THE INVENTION

The cost of such a personal telephone calling capability is high, because there are two telephone calls and a page that must be paid for. This is especially true if, as is presently envisioned, the called party, who receives the benefit of being constantly reachable, bears the responsibility for the cost of both calls and the page. Also, the intrusive nature of being paged at any time regardless of location may become annoying in the event of misdialed numbers, even if the identity of the callers are screened. Therefore, we have found it beneficial to announce to each caller that he has reached the called party's personal telephone number and not to charge for the telephone call if the caller terminates his call during, or substantially immediately after the conclusion of, the announcement. Such an announcement is often accompanied by other information, such as a request that the caller enter personal identification information, e.g., a personal identification number (PIN), or information telling the caller how to directly reach the voice mail of the called party, e.g., by pressing star (*) followed by the pound sign (#).

However, most callers who reach a personal telephone number have dialed the personal telephone number intentionally and correctly. Also, they have typically dialed the personal telephone number many times, and are not in need of the information provided by the announcement. Instead, they desire to establish the telephone call to the called party as quickly as possible.

To fulfill this desire, we employed the well known "type-ahead" feature, whereby a user may type (enter) the next command, without waiting for the conclusion of the previous command or prompt, and the next command immediately executes. This feature enables experienced users of a service to benefit from a faster response time for the desired service while providing all the necessary information for novice users to correctly operate the service. For callers who have intentionally and correctly dialed a personal telephone number, upon detection of the typing (entering) of the last character of a valid command string, e.g., a pound (#), a page to the called party is immediately initiated by the bridging and signaling unit. Also, the bridging and signaling unit responds by beginning its next mode of operation, e.g., playing so-called "music on hold" to the caller, which is done while waiting for receipt of the called party's return telephone call.

We then recognized that a problem results with a) employing the type-ahead feature for a call placed to a personal telephone number, when b) the caller is not billed for the call unless he remains on the call through the entire announcement, namely, that a caller may fraudulently obtain free paging service. This results because, if the caller types ahead and enters the last character of a valid command string prior to the end of the announcement, a page will be transmitted to the called party, e.g., containing information supplied by the caller identifying himself or, as is our default, information identifying the location of the call, such as the telephone number of the calling telephone. However, if thereafter, prior to the end of the time in which the announcement would have completed, the caller hangs up, there will be no charge for either a) the call and b) the resulting page assessed to the caller. This is because, as noted above, there is no charge for the telephone call if the caller disconnects during, or substantially immediately after the conclusion of, the announcement.

To overcome this problem, in accordance with the principles of the invention, although type-ahead is permitted, the page for a call placed to a personal telephone number is not immediately initiated upon receipt of the last character of a valid command string prior to the end of the announcement. Instead, the bridging and signaling unit is arranged to respond so that it appears to have accepted and executed the command, and moves into the next phase of operation, e.g., music on hold. However, the page is not initiated until it is determined that both 1) the entire time for the announcement has elapsed from the receipt of the caller's call, i.e., the time of commencement of billing has arrived, and 2) the caller remains on the call at that time. Advantageously, the caller perceives, and so believes, that his call is being processed faster while all calls that result in pages are billed.

DETAILED DESCRIPTION

Figure 1:
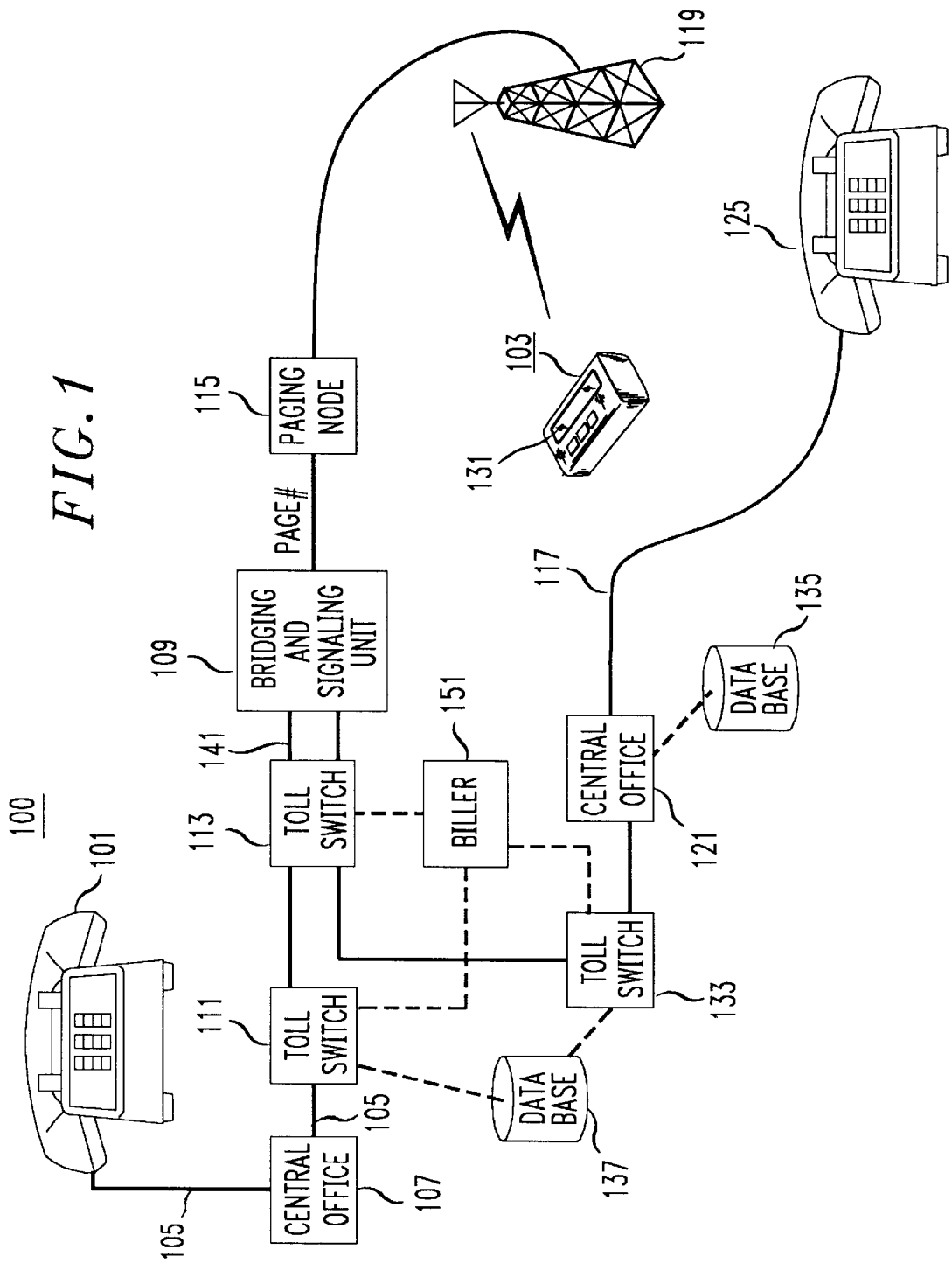
FIG. 1 shows an arrangement for providing telecommunications services, in accordance with the principles of the invention.

FIG. 1 shows arrangement 100 for providing telecommunications services, in accordance with the principles of the invention. A caller places a telephone call from calling telephone 101 to the personal telephone number of an individual associated with pager 103. The caller's telephone call passes over telephone line 105 to central office 107 of a local exchange carrier. Central office 107, in turn, routes the telephone call to toll switch 111.

The caller's telephone call is then routed by toll switch 111 through toll switch 113 to bridging and signaling unit 109. Bridging and signaling unit 109 is associated with the called number. The above described routing is performed in the conventional manner.

Bridging and signaling unit 109 implements one or more so-called "meet-me bridges", each of which is for connecting at least two incoming telephone calls to each other. Upon receiving an incoming telephone call from a caller at bridging and signaling unit 109, ringback tone is supply to the caller. Answer supervision is also supplied so that a) an interruptable announcement may be played to the caller and b) an optional personal identification number (PIN) may be received from the caller.

Should an appropriate time—as described hereinbelow—arrive, bridging and signaling unit 109 forwards paging information to paging node 115. The paging information includes a predetermined code that uniquely identifies the called individual's pager 103. The correct code can be determined because pager 103 is also associated with the called personal telephone number. A copy of the predetermined code is stored within pager 103. The optional PIN, if entered by the caller, is transmitted to pager 103 as part of the calling information. It may be used in lieu of, or as a supplement to, the telephone number of the calling telephone.

In response to receipt of the paging information, paging node 115 causes a paging signal containing the paging information to be broadcast from paging tower 119. Pagers and paging systems are well known in the art.

Pager 103 receives paging signals transmitted from paging tower 119. In the event that the code contained within the paging information of a paging signal matches the predetermined code stored in pager 103, pager 103 alerts. In response to the alerting by pager 103, the owner of pager 103 can originate a telephone call, which is the so-called "return telephone call", from telephone 125 to a particular predetermined telephone number. Such a return telephone call may be automatically placed if pager 103 and telephone 125 are incorporated into a single device. As such, central office 121 receives the return telephone call and routes it to bridging and signaling unit 109 for connection to the caller's telephone call. To this end, central office 121 routes the return telephone call to toll switch 133, e.g., of an inter-exchange carrier. Upon receipt of the return telephone call at the bridging and signaling unit, the caller's telephone call and the return telephone call are bridged, i.e., connected, together at the meet-me bridge holding the caller's call, so that the caller and the called party may communicate.

The telephone number of the return telephone call may be translatable, i.e., a data base lookup must be performed to determine the routing telephone number to which the telephone call is actually completed, e.g., a 500-, 700-, 800-, or 900-type of telephone number. An advantage of using a translatable telephone number is that it allows the owner of pager 103 to place the return telephone call without having any information about the area code of the telephone line which he is using. The association of central office 121 with database 135 is for the central office to know to which inter-exchange carrier to route the telephone call. Toll switch 133 employs database 137 in the translation of translatable telephone numbers, e.g., such as for a return telephone call.

To understand the present invention, the typical arrangements in telephone networks for recording messages used to bill charges for telephone calls should first be described. Such arrangements operate by recording the relevant billing data for each toll telephone call, or connection, in a so-called automatic message account, or AMA, message record. Typical message record fields are the originating and terminating telephone numbers and elapsed time of the telephone call. In a typical system, the message records, which are opened for each telephone call upon receipt of answer supervision for the telephone call and are closed at a time substantially contemporaneous with the termination of the telephone call, are transmitted from an originating switch to a message accumulation system. The latter distributes the accumulated messages to appropriate further processing systems which translate the AMA message records into the industry-standard "exchange message interface," or EMI, message record format. The EMI records are thereupon forwarded to a rating system which, inter alia, computes the toll charges applicable to the calls and adds an indication of those charges to the EMI record. The records so formed are forwarded to a billing system in which they reside until processed to generate, typically, "hard copy" bills which are mailed to subscribers. Thus, conceptually, each subscriber is associated with an account to which the cost of calls are charged until they are billed and payment becomes due.

As is well known, the cost for each toll telephone call, as rated by a rating system, is usually determined as a function of the length of time that passes while the originating subscriber is connected to the terminating subscriber. The total length of time that passes while the originating subscriber is on the telephone call after answer supervision is divided into indivisible time periods, usually having identical predetermined lengths, and a period cost is assigned to each period. A typical value for the length of each indivisible time period is one minute. The number of time periods is rounded up, so that each telephone call has an integral number of indivisible time periods. The totalized cost of the period costs for all of the time periods of the telephone call is the cost of the telephone call.

Although a current practice in the art is to employ the above-described three-layered billing architecture and the various types of records, there is no conceptual reason why a simplified, e.g., one or two level, architecture using a single record type cannot be utilized instead. Therefore, for clarity of exposition, it is assumed herein that all billing aspects of a telephone call are handled by biller 151. Biller 151 employs simply so-called "billing records", the initial version of which, if any, for each telephone call is received from the switch responsible for billing the telephone call and populates the fields thereof as necessary. Appropriate bills are periodically generated for each subscriber. Those of ordinary skill in the art will be able to implement the invention from the description hereinbelow using a billing architecture of their choosing.

Figure 2:
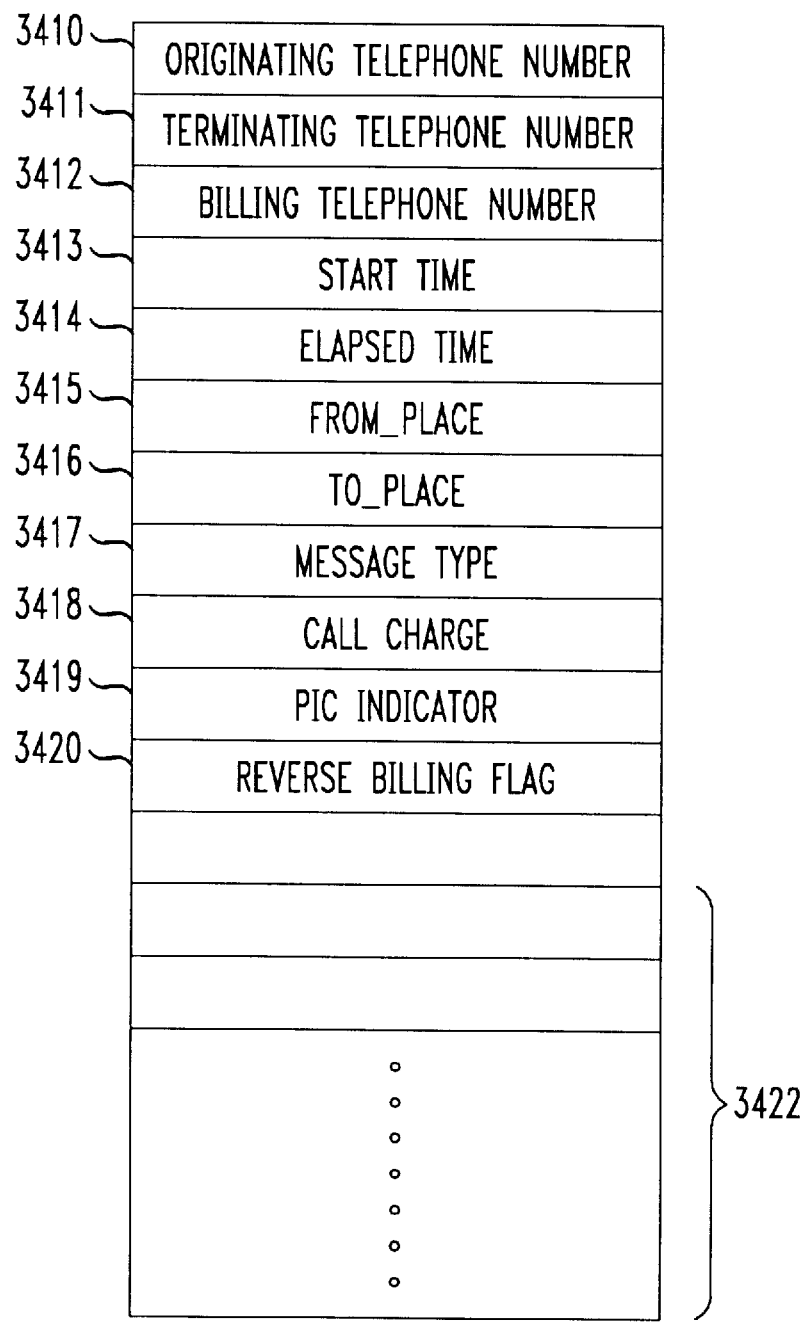
FIG. 2 is a conceptual representation of a billing record.

FIG. 2 is a conceptual representation of a billing record. The fields are shown arranged for pedagogic convenience. Some of the more significant fields of the billing record are the originating telephone number 3410 (i.e., the telephone number (ANI) of the originating subscriber); the terminating telephone number 3411 (i.e., the telephone number (ANI) of the terminating subscriber); the billing telephone number 3412, which while typically empty is used to indicate the account of the party responsible for the cost telephone call if the cost is not to be associated with the telephone number of the originating telephone; the start time for the telephone call 3413; the elapsed time 3414, i.e., the duration of the telephone call; the geographic telephone call origination and termination points, e.g. Edison, N.J. and San Francisco, Calif., denoted as FROM_PLACE 3415 and TO_PLACE 3416; message type 3417, which indicates that the telephone call was, for example, a direct-dialed domestic telephone call, an operator-assisted international telephone call, etc.;

telephone call charge 3418, which is the basic telephone call cost for the telephone call computed as a function of various ones of the message characteristics recorded in the billing message such as described above; reverse billing (collect telephone call) flag 3420; and various other data fields denoted as 3422.

Figure 3:
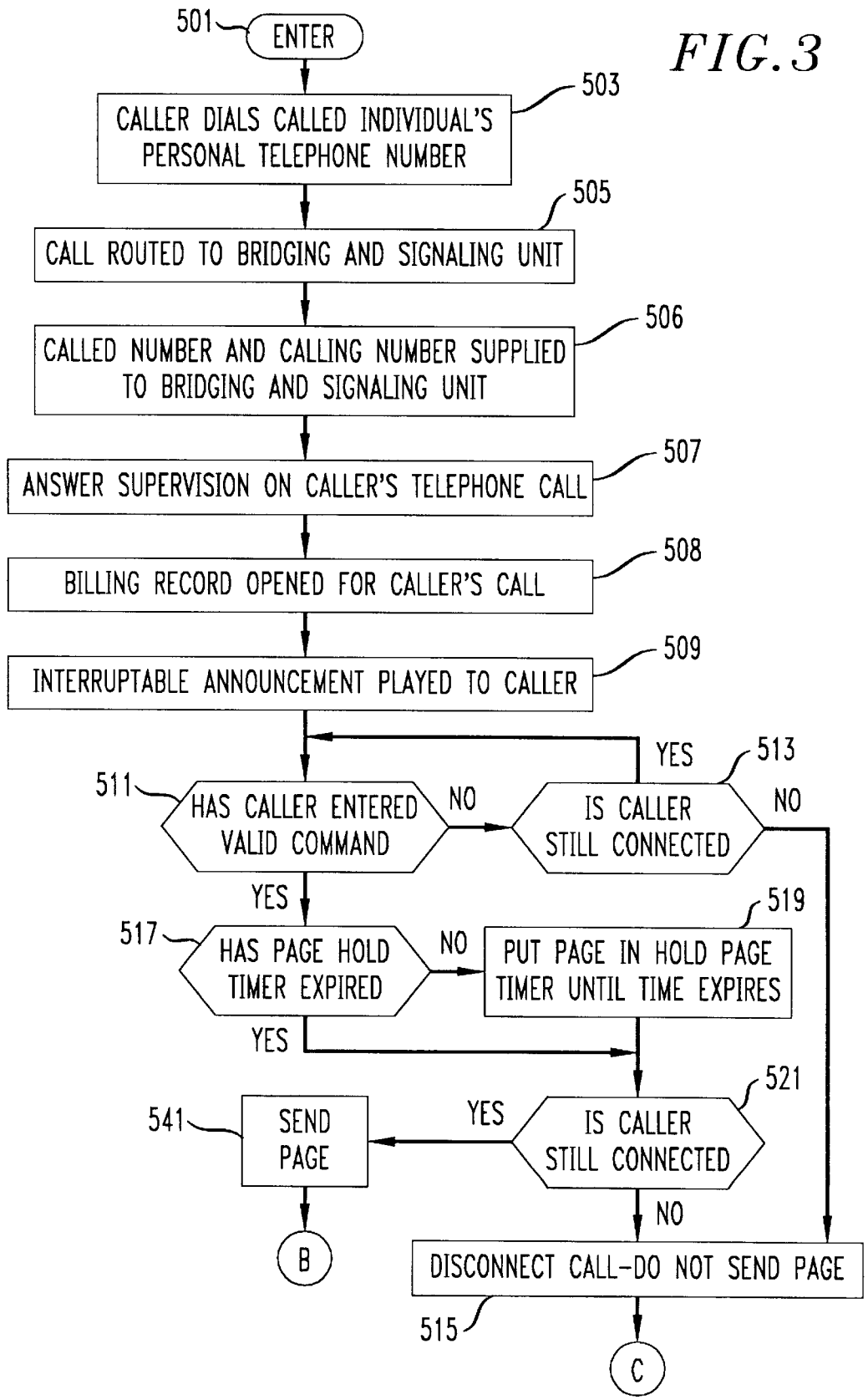
FIGS. 3, 4, and 5, when connected together, show a flow chart of an exemplary process for completing a telephone call placed to the personal telephone number of a called individual associated with one of pagers of FIG. 1, in accordance with the principles of the invention.
Figure 4:
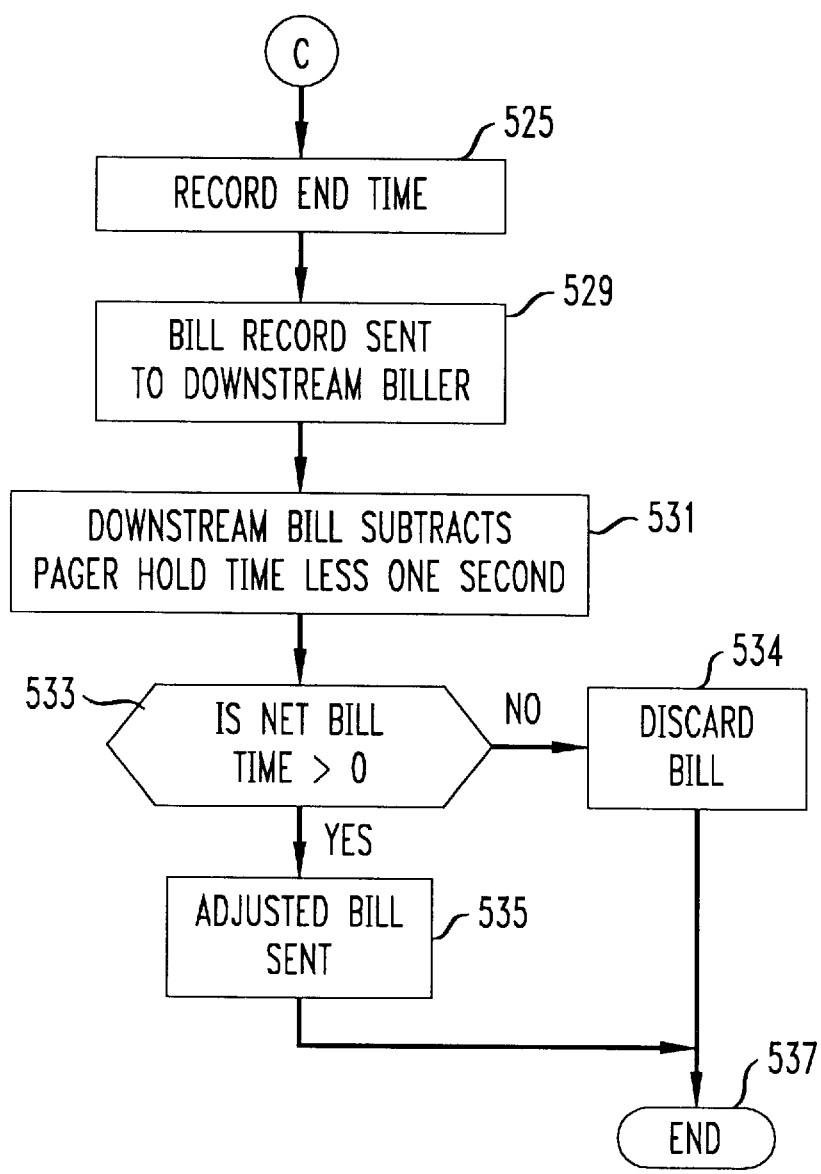
Figure 5:
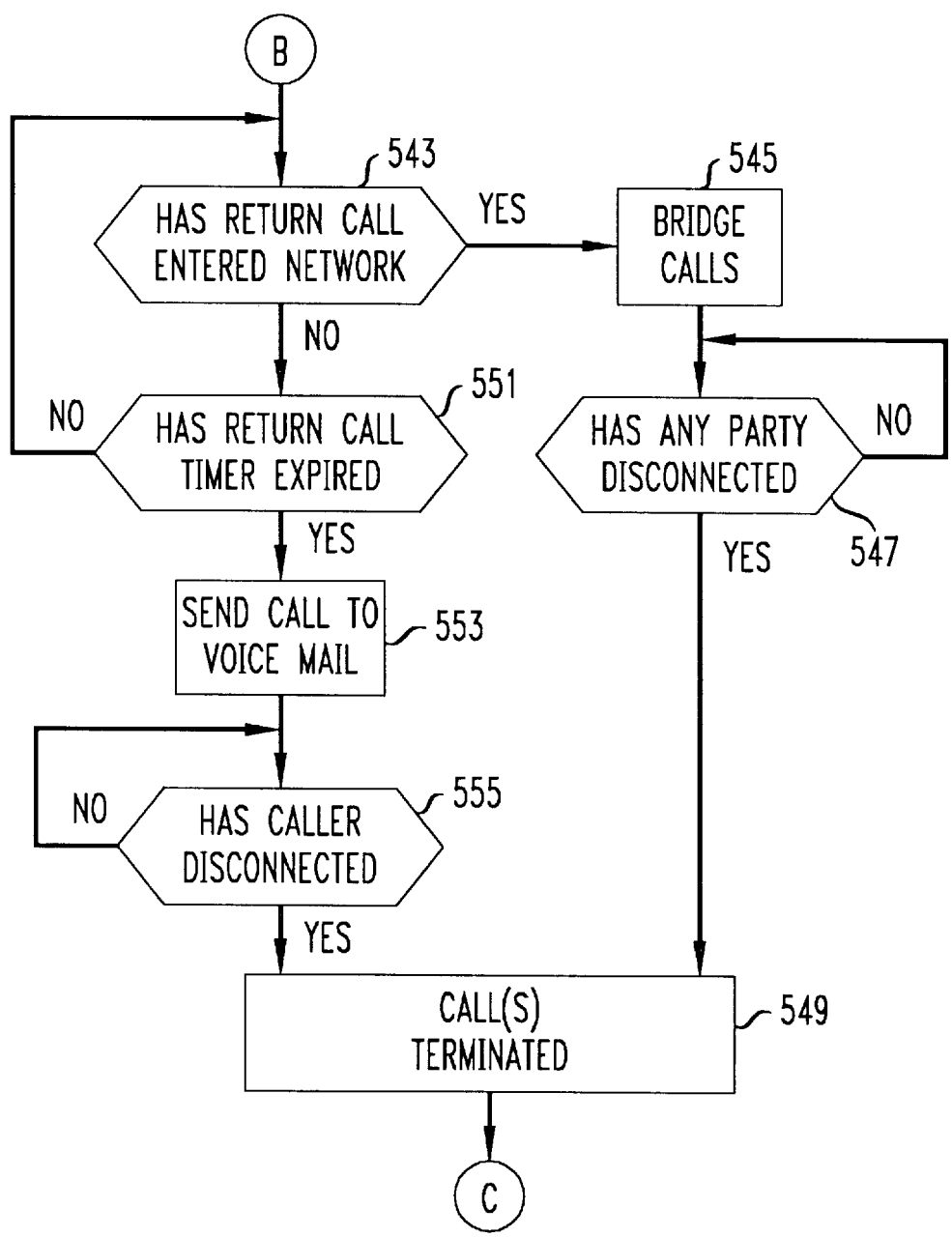

FIGS. 3, 4, and 5, when connected together, show a flow chart of an exemplary process for completing a telephone call placed to the personal telephone number of a called individual associated with one of pagers 103 (FIG. 1), in accordance with the principles of the invention. The process begins in step 501 (FIG. 5) when a caller decides to make a telephone call to the personal telephone number of the individual associated with pager 103. To this end, in step 503, the caller dials the called individual's personal telephone number at telephone 101 (FIG. 1). The telephone call is routed to bridging and signaling unit 109 in step 505, e.g., via central office 107 and toll switches 111 and 113. The called number and, if available, the calling number are supplied to bridging and signaling unit 109, in step 506.

In step 507, bridging and signaling unit 109 provides answer supervision on the caller's telephone call. A billing record is opened for the telephone call in step 508. In step 509, bridging and signaling unit 109 also, optionally, plays an interruptable announcement, i.e., interruptable using the type-ahead feature, to the caller. Depending on the prior selection of the called party, the announcement may inform the caller that they have reached a platform that is used for personal mobile communications, also known as, "personal reach service (PRS)". The announcement may also prompt the caller to enter an identifying code that they have been assigned by the called party, e.g., a personal identification number (PIN). The calling party may hang up if they determine that they have not reached the telephone number that they desired, i.e., they had misdialed and actually were not attempting to dial a personal reach service telephone number.

Conditional branch point 511 tests to determine if the caller has entered a valid command, e.g., a) an identifying code and the command terminator, such as a pound sign (#), or b) simply the command terminator, indicating to use the telephone number of the calling telephone as the identifying information. If the test result in step 511 is NO, control passes to conditional branch point 513, which tests to determine if the caller is still connected on the telephone call to bridging and signaling unit 109. If the test result in step 513 is YES, control passes back to step 511. If the test result in step 513 is NO, control passes to step 515, in which the telephone call is disconnected. Note that, in accordance with an aspect of the invention, no page is transmitted in response to the caller's telephone call. The steps subsequent to step 515 will be described further below.

If the test result in step 511 is YES, indicating that the caller has entered an identifying code, control passes to conditional branch point 517, which tests to determine if the page hold time has expired. The page hold timer is the length of time, from the giving of answer supervision, that must pass before a page will be transmitted to the called party. If the test result in step 517 is NO, control passes to step 519, which places the telephone call on hold until expiry of the page hold time. In a preferred embodiment of the invention, the page hold time is the same length as that of the time necessary to complete the playing of the announcement. Thus, advantageously, in accordance with the principles of the invention, no charge will be incurred when a caller hangs up during the announcement, e.g., he realizes that he dialed the wrong number.

If the test result in step 517 is YES, or after completion of step 519 by expiry of the page hold time, control passes to conditional branch point 521, which tests to determine if the caller is still connected on the telephone call to bridging and signaling unit 109.

If the test result in step 521 is NO, control passes to step 515, in which the telephone call is disconnected. Note that, in accordance with an aspect of the invention, no page is transmitted in response to the caller's telephone call.

Control passes from step 515 to step 525, in which the ending time of the caller's telephone call is recorded in the billing record. The billing record is then forward to biller 151 in step 529. In step 531, an adjusted duration equal to the duration of the caller's telephone call minus an amount of time equal to the predetermined page hold time plus one second is determined. Conditional branch point 533 tests to determine if the value of the adjusted duration is greater than zero.

If the test result in step 533 is YES, i.e., the adjusted duration is greater than zero, indicating that the caller remained connected on his telephone call for a sufficient duration of time to have a paging signal transmitted to the called party on his behalf, in accordance with an aspect of the invention, control passes to step 535, in which the value of the adjusted duration is placed into adjusted duration field 3421. The billing record is then forward charged to the account of the responsible party. It is noted that responsibility for the payment of the cost of the telephone call may be assigned based upon the calling party, the called party, or a combination thereof. The process then exits in step 537.

If the test result in step 533 is NO, i.e., the adjusted duration is zero or less, indicating that the caller remained connected on his telephone call for an insufficient duration of time to have a paging signal transmitted to the called party on his behalf, control passes to step 539, in which the billing record is discarded. Instead of discarding the billing record, a value of zero (0) may placed into adjusted duration field 3421. The process then exits in step 537.

Note that steps 525–539 apply only to the caller originated telephone call.

If the test result in step 521 is YES, control passes to step 541, in which a paging signal is transmitted to the called party, in accordance with an aspect of the invention. As described above, the paging information transmitted in the paging signal includes at least a predetermined code that uniquely identifies the called individual's pager 103. A copy of the predetermined code is stored within pager 103. The paging information may also contain the PIN entered by the caller and the telephone number of calling telephone 101.

Next, control passes to conditional branch point 543, which tests to determine if the return telephone call from the called party has been received at bridging and signaling unit 109. If the test result in step 543 is YES, control passes to step 545, in which the caller's telephone call and the return telephone call are bridged together. Thus, the caller can communicate with the called party on a real-time basis.

Control then passes to conditional branch point 547, which tests to determine if the caller or called party has disconnected from the telephone call. If the test result in step 547 is NO, indicating that the connection between the caller and called party remains in progress, control passes back to step 547. If the result in step 547 is YES, indicating that the connection between the caller and called party has been discontinued, control passes to step 549, in which both telephone calls are terminated. Control then passes to step 525 and the process continues as described above.

If the test result in step 543 is NO, indicating that a return telephone call has not been received, control passes to conditional branch point 551, which tests to determine if a predetermined period of time allotted for receipt of the return telephone call has elapsed. If the test result in step 551 is NO, control passes back to step 543. If the test result in step 551 is YES, control passes to step 553, in which the caller is transferred to voice mail for the called party. Next, conditional branch point 555 tests to determine if either the caller has disconnected from the telephone call. If the test result in step 555 is NO, control passes back to step 555. If the test result in step 555 is YES, control passes step 549 and the process continues as described above.

It is noted that telephone 125 may be a mobile telephone station. If so, central office 121 is a mobile telephone switching office (MTSO).

If voice mail interrupt is employed, if the return telephone call is received while the caller is connected to voice mail in step 553, control will jump to step 553.

The foregoing merely illustrates the principles of the inventions. It will thus be appreciated that those skilled in the art will be able to devise various arrangements which, although not explicitly described or shown herein, embody the principles of the invention and are thus within its spirit and scope.

We claim:

1. A method for use in completing a telephone call from a caller that is placed to the personal telephone number of a called party, said telephone call placed by said caller to be bridged to a return telephone call originated by said called party in response to receipt of a paging signal by a pager of said called party, the method comprising the steps of:

receiving said telephone call;

playing an interruptible announcement to said caller;

receiving a command from said caller interrupting said announcement, said command indicating that the caller desires to be connected to said called party as soon as possible;

stopping the playing of said announcement upon receipt of said command from said caller;

determining whether or not said caller is still connected on said telephone call at a time at which said announcement would have completed playing had it not been interrupted; and initiating the broadcasting of said paging signal to said pager only when the result of said determining step is that said caller is still connected on said telephone call.

2. The invention as defined in claim 1 further including the steps of:

opening a billing record for said telephone call; and retaining said billing record with a non-zero charge for said telephone call only when said page is broadcast.

3. The invention as defined in claim 1 further including the steps of:

opening a billing record for said telephone call; and retaining said billing for said telephone call only when said page is broadcast.

4. The invention as defined in claim 1 further including the step of opening a billing record for said telephone call when said page is broadcast.

5. The invention as defined in claim 4 wherein said billing record is initialized to zero.

6. The method of claim 4 wherein said billing record is initialized to a period of time equal to the time for which it would take to play the announcement in its entirety.

7. A method for use in generating a billing record for a telephone call placed by a caller to the personal telephone number of a called party, said telephone call placed by said caller to be bridged to a return telephone call originated by said called party in response to receipt of a paging signal by a pager of said called party, the method comprising the steps of:

playing an interruptable announcement to said caller;

receiving a command from said caller interrupting said announcement, said command indicating that caller desires to be connected to said called party as soon as possible;

stopping the playing of said announcement upon receipt of said command from said caller;

waiting substantially until the time at which said announcement would have completed playing had it not been interrupted and then determining if said caller's telephone call remains in existence;

initiating transmission of said paging signal only when it is determined that said caller's telephone call remains in existence at the time at which said announcement would have completed playing had it not been interrupted; and storing information for billing said caller's telephone call only when transmission of said paging signal is initiated.

8. The invention as defined in claim 7 wherein said a time of said call stored in said billing information record is initialized to the length of time to play said announcement in its entirety.

9. The invention as defined in claim 7 wherein said a time of said call stored in said billing information record is initialized to zero.

10. A method for use in generating a billing record for a telephone call placed by a caller to the personal telephone number of a called party, said telephone call placed by said caller to be bridged to a return telephone call originated by said called party in response to receipt of a paging signal by a pager of said called party, the method comprising the steps of:

playing an interruptable announcement to said caller;

receiving a command from said caller interrupting said announcement, said command indicating that caller desires to be connected to said called party as soon as possible;

stopping the playing of said announcement upon receipt of said command from said caller;

waiting substantially until the time at which said announcement would have completed playing had it not been interrupted and then determining if said caller's telephone call remains in existence;

initiating transmission of said paging signal only when it is determined that said caller's telephone call remains in existence at the time at which said announcement would have completed playing had it not been interrupted; and rendering a bill for said caller's telephone call only if said initiating step is executed.

11. The invention as defined in 10 wherein said bill includes a charge for the entire length of said call.

12. The invention as defined in 10 wherein said bill includes a charge for the entire length of said call less the length of time to play said announcement in its entirety.

13. A method for use in generating a billing record for a telephone call placed by a caller to the personal telephone number of a called party, said telephone call placed by said caller to be bridged to a return telephone call originated by said called party in response to receipt of a paging signal by a pager of said called party, the method comprising the steps of:

receiving said telephone call;

opening a billing record for said telephone call;

playing an interruptable announcement to said caller;

receiving a command from said caller interrupting said announcement, said command indicating that caller desires to be connected to said called party as soon as possible;

stopping the playing of said announcement upon receipt of said command from said caller;

waiting substantially until the time at which said announcement would have completed playing had it not been interrupted and then determining if said caller's telephone call remains in existence;

discarding said billing record only when it is determined that said caller's telephone call no longer remains in existence at the time at which said announcement would have completed playing had it not been interrupted; and initiating the transmission of a page only when only when it is determined that said caller's telephone call remains in existence at the time at which said announcement would have completed playing had it not been interrupted.

14. A method for use in generating a billing record for a telephone call placed by a caller to the personal telephone number of a called party, said telephone call placed by said caller to be bridged to a return telephone call originated by said called party in response to receipt of a paging signal by a pager of said called party, the method comprising the steps of:

receiving said telephone call;

opening a billing record for said telephone call;

playing an interruptable announcement to said caller;

receiving a command from said caller interrupting said announcement, said command indicating that caller desires to be connected to said called party as soon as possible;

stopping the playing of said announcement upon receipt of said command from said caller;

waiting substantially until the time at which said announcement would have completed playing had it not been interrupted and then determining if said caller's telephone call remains in existence;

marking said billing record so as not to generate a charge only when it is determined that said caller's telephone call no longer remains in existence at the time at which said announcement would have completed playing had it not been interrupted; and initiating the transmission of a page only when only when it is determined that said caller's telephone call remains in existence at the time at which said announcement would have completed playing had it not been interrupted.

15. A method for use in billing a telephone call placed by a caller to the personal telephone number of a called party, said telephone call placed by said caller to be bridged to a return telephone call originated by said called party in response to receipt of a paging signal by a pager of said called party, the method comprising the steps of:

supplying an interruptable prompt to said caller;

receiving a command from said caller interrupting said prompt, said command indicating that caller desires to be connected to said called party as soon as possible;

stopping the playing of said announcement upon receipt of said command from said caller;

waiting substantially until the time at which said announcement would have completed playing had it not been interrupted and then determining if said caller's telephone call remains in existence;

initiating transmission of said paging signal only when it is determined that said caller's telephone call remains in existence at the time at which said announcement would have completed playing had it not been interrupted; and storing information for billing said caller's telephone call only when transmission of said paging signal is initiated.

16. A method for use in billing a telephone call placed by a caller to the personal telephone number of a called party, said telephone call placed by said caller to be bridged to a return telephone call originated by said called party in response to receipt of a paging signal by a pager of said called party, the method comprising the steps of:

supplying an interruptable prompt to said caller;

receiving a command from said caller interrupting said prompt, said command indicating that caller desires to be connected to said called party as soon as possible;

stopping the playing of said announcement upon receipt of said command from said caller;

waiting substantially until the time at which said announcement would have completed playing had it not been interrupted and then determining if said caller's telephone call remains in existence;

initiating transmission of said paging signal only when it is determined that said caller's telephone call remains in existence at the time at which said announcement would have completed playing had it not been interrupted; and rendering a bill for said caller's telephone call only if said initiating step is executed.

* * * * *